(12) United States Patent
Narimatsu et al.

(10) Patent No.: US 12,117,795 B2
(45) Date of Patent: Oct. 15, 2024

(54) FLUCTUATION AMOUNT ESTIMATION DEVICE IN MACHINE TOOL AND CORRECTION AMOUNT CALCULATION DEVICE

(71) Applicant: DMG MORI CO., LTD., Nara (JP)

(72) Inventors: Koichiro Narimatsu, Nara (JP); Naruhiro Irino, Nara (JP); Masahiro Shimoike, Nara (JP)

(73) Assignee: DMG MORI CO., LTD., Nara (JP)

( * ) Notice: Subject to any disclaimer, the term of this patent is extended or adjusted under 35 U.S.C. 154(b) by 407 days.

(21) Appl. No.: 17/605,155

(22) PCT Filed: Oct. 24, 2019

(86) PCT No.: PCT/JP2019/041635
§ 371 (c)(1),
(2) Date: Oct. 20, 2021

(87) PCT Pub. No.: WO2020/217571
PCT Pub. Date: Oct. 29, 2020

(65) Prior Publication Data
US 2022/0197242 A1 Jun. 23, 2022

(30) Foreign Application Priority Data
Apr. 23, 2019 (JP) .................. 2019-081678

(51) Int. Cl.
*G05B 19/404* (2006.01)
*G06N 3/08* (2023.01)
(52) U.S. Cl.
CPC ............. *G05B 19/404* (2013.01); *G06N 3/08* (2013.01); *G05B 2219/41116* (2013.01)
(58) Field of Classification Search
None
See application file for complete search history.

(56) References Cited

U.S. PATENT DOCUMENTS

| 2004/0015933 | A1 | 1/2004 | Campos et al. |
| 2012/0165971 | A1* | 6/2012 | Murahashi ......... B23Q 11/0007 700/175 |

(Continued)

FOREIGN PATENT DOCUMENTS

| DE | 102017210955 A1 | 1/2019 |
| JP | H11114776 A | 4/1999 |

(Continued)

OTHER PUBLICATIONS

Extended European Search Report for related Application No. 19926272.6; report dated Nov. 29, 2022.

(Continued)

*Primary Examiner* — David Earl Ogg
(74) *Attorney, Agent, or Firm* — von Briesen & Roper, s.c.

(57) ABSTRACT

Provided are a fluctuation amount estimation device (9) capable of evaluating reliability of an estimated value and a correction amount calculation device (1) including the fluctuation amount estimation device (9). The correction amount calculation device (1) includes the fluctuation amount calculation device (9), a correction amount calculation unit (5), and a correction amount output unit (7). The fluctuation amount estimation device (9) includes a parameter storage (3) storing parameters as constituent elements of a neural network obtained by machine learning, an estimation unit (2) estimating a fluctuation amount relevant to a position of an element arranged in a machine tool (11) or a fluctuation amount of a distance between elements arranged in the machine tool (11) for each physical condition information of the machine tool (11) by means of the neural network with a parameter freely selected from the parameters being omitted, and a reliability evaluation unit (4) evaluating reliability of estimated multiple fluctuation amounts based on the estimated fluctuation amounts. The correction amount cal- (Continued)

culation unit (5) calculates a correction amount for the estimated fluctuation amounts based on the fluctuation amounts, and the correction amount output unit (7) outputs the calculated correction amount to outside.

16 Claims, 9 Drawing Sheets

(56) References Cited

U.S. PATENT DOCUMENTS

| | | | | |
|---|---|---|---|---|
| 2014/0156056 A1* | 6/2014 | Kotake | ............. | G05B 19/4155 700/174 |
| 2015/0006444 A1* | 1/2015 | Tamatsu | ................ | G06N 3/082 706/12 |
| 2018/0196405 A1* | 7/2018 | Maekawa | ............ | G05B 19/404 |
| 2019/0099849 A1 | 4/2019 | Hada et al. | | |
| 2019/0099850 A1 | 4/2019 | Hada et al. | | |

FOREIGN PATENT DOCUMENTS

| | | |
|---|---|---|
| JP | 2000507376 A | 6/2000 |
| JP | 2003094291 A | 4/2003 |
| JP | 2015011510 A | 1/2015 |
| JP | 5803261 B2 | 11/2015 |
| JP | 2016002634 A | 1/2016 |
| JP | 2018111145 A | 7/2018 |
| KR | 20180014364 A | 2/2018 |

OTHER PUBLICATIONS

Yarin Gal, et al., "Dropout as a Bayesian Approximation: Representing Model Uncertainty in Deep Learning", 2016, University of Cambridge, Proceedings of the 33rd International Conference on Machine Learning, New York, NY, USA.

International Search Report for related Application No. PCT/JP2019/041635; report dated Dec. 24, 2019.

\* cited by examiner

Neural network model

Input layer  Intermediate layer  Output layer

Arithmetic algorithm

Input layer  Intermediate layer  Output layer $A_j = f((\Sigma Hw_{i,j} \cdot t_i) + V_j)$ $D = f((\Sigma Kw_j \cdot A_j) + Kv)$ $f(u) = 1/(1 + exp(-u))$ Input layer  Intermediate layer  Output layer Input layer  Intermediate layer  Output layer

FLUCTUATION AMOUNT ESTIMATION DEVICE IN MACHINE TOOL AND CORRECTION AMOUNT CALCULATION DEVICE

TECHNICAL FIELD

The present invention relates to a fluctuation amount estimation device that estimates a fluctuation amount relevant to a position of an element arranged in a machine tool or a fluctuation amount of a distance between elements arranged in the machine tool, and relates to a correction amount calculation device that calculates a correction amount for the estimated fluctuation amount based on the fluctuation amount.

BACKGROUND ART

In the field of machine tools, it is known that thermal deformation (including thermal displacement) of elements arranged in a machine tool occurs due to change of the ambient temperature in which the machine tool is installed and due to heat generated by motion mechanisms of the machine tool operating, such as heat generated in a bearing supporting a spindle because of the spindle rotating and heat generated in drive motors or in sliding units because of the drive motors operating.

When such thermal deformation of machine tool elements occurs, for example, in the case of thermal deformation occurring on a ball screw that drives a moving member, the accuracy of positioning the moving member is reduced due to the thermal deformation, which results in poor machining accuracy. In the case of thermal deformation occurring on a spindle that holds and rotates a workpiece or a tool, a relative positional relation between the tool and the workpiece is fluctuated, that is to say, the tool and the workpiece are thermally displaced, due to the thermal deformation, which results in poor machining accuracy.

To solve this problem, conventionally, the amount of thermal displacement of an element arranged in the machine tool is estimated and, for example, a positioning position for the workpiece and the tool is corrected in accordance with the estimated thermal displacement amount. In recent years, the attempt has been made to estimate such a thermal displacement amount by a machine learning method. Patent Literature 1 listed below discloses a machine learning device for estimating such a thermal displacement amount.

The machine learning device as disclosed in Patent Literature 1 uses machine learning to optimize an equation for estimating a thermal displacement amount of a thermally expanding machine element of a machine tool based on operating state data indicative of an operating state of the machine element. The machine learning device includes:
- data obtaining means for obtaining the operating state data of the machine element;
- thermal displacement amount obtaining means for obtaining measured values of the thermal displacement amount of the machine element;
- storing means for storing, as training data, the operating state data of the machine element obtained by the data obtaining means and the measured values of the thermal displacement amount of the machine element obtained by the thermal displacement amount obtaining means associated with each other as labels;
- equation setting means for setting an equation for calculating the thermal displacement amount of the machine element, by performing machine learning based on the operating state data of the machine element and the measured values of the thermal displacement amount of the machine element;
- thermal displacement amount calculating means for calculating an estimated value of the thermal displacement amount of the machine element, by substituting operating state data of the machine element within a predetermined period of time stored as training data in the storing means into the equation set by the equation setting means; and
- determining means for determining whether a difference between the estimated value of the thermal displacement amount of the machine element within the predetermined period of time calculated by the thermal displacement amount calculating means and a measured value of the thermal displacement amount of the machine element within the predetermined period of time stored as training data in the storing means exceeds a predetermined threshold, and
- the equation setting means sets the equation again when the determining means determines that the difference exceeds the predetermined threshold, while the equation setting means sets the equation as an optimal equation when the determining means determines that the difference does not exceed the predetermined threshold.

According to Patent Literature 1, this machine learning device is able to optimize an equation for estimating a thermal displacement amount of a machine element in a machine tool, by repeating machine learning (supervised learning) using training data in which operating state data of the machine element and measured values for the thermal displacement amount of the machine element are associated with each other, which consequently enables accurate correction of the thermal displacement amount in various types of machining.

CITATION LIST

Patent Literature

[Patent Literature 1] Japanese Unexamined Patent Application Publication No. 2018-111145

SUMMARY OF INVENTION

Technical Problem

In recent years, machine learning as descried above employs supervised deep learning using as a model a neural network having multiple intermediate layers (hidden layers). Such deep learning is generally evaluated as providing high estimation accuracy.

However, as a result of intensive studies, the inventors of the present invention have found that even deep learning cannot provide high estimation accuracy under all conditions, so that input data which is unlearned data, in other words, input data which greatly differs from learned data, results in an estimated value having an error, that is to say, results in an inaccurate estimation result. For example, in the case where temperature data measured by a temperature sensor is used as input data, if measured data extremely differs from a normal value because of failure of the temperature sensor, an estimated value obtained by means of a neural network as described above has a large error. Further, insufficient learning also can result in an estimated value having an error.

Therefore, when an estimated value obtained from deep learning results has low reliability, in other words, when an estimated value has a large error, a correction amount based on the estimated value is inaccurate (inappropriate). Carrying out correction based on such a correction amount would rather reduce machining accuracy.

The present invention has been achieved in view of the above-described circumstances, and an object of the invention is to provide a fluctuation amount estimation device which is able to estimate a fluctuation amount of an element or a fluctuation amount between elements in a machine tool by means of a neural network and evaluate reliability of an estimated value of the fluctuation amount. Another object of the invention is to provide a correction amount calculation device which is able to calculate a correction amount for the fluctuation amount estimated by the fluctuation amount estimation device and adjust the calculated correction amount in accordance with evaluation of the estimated value.

Solution to Problem

To solve the above-described problem, the present invention provides a fluctuation amount estimation device in a machine tool, including:
  a parameter storage storing therein a plurality of parameters defining a relation between a fluctuation amount relevant to a position of an element arranged in the machine tool or a fluctuation amount of a distance between elements arranged in the machine tool and physical condition information as information indicative of a physical condition of the machine tool, the plurality of parameters being constituent elements of a neural network and being obtained by machine learning using the neural network;
  an estimation unit estimating the fluctuation amount based on the parameters stored in the parameter storage and the physical condition information input successively from outside, the estimation unit repeating, for each of the input physical condition information, estimation of the fluctuation amount by mean of the neural network multiple times with a parameter freely selected from the plurality of parameters being omitted; and
  a reliability evaluation unit evaluating reliability of multiple fluctuation amounts for each of the physical condition information estimated by the estimation unit, based on the estimated multiple fluctuation amounts.

In this fluctuation amount estimation device, first of all, a plurality of parameters defining a relation between a fluctuation amount relevant to a position of an element arranged in the machine tool or a fluctuation mount of a distance between elements arranged in the machine tool and physical condition information as information indicative of a physical condition of the machine tool are stored in advance into the parameter storage. These parameters are constituent elements of a neural network used in machine learning. These parameters are obtained by supervised learning using the neural network.

The estimation unit estimates the fluctuation amount based on the parameters stored in the parameter storage and the physical condition information input successively from outside. In this process, the estimation unit repeats, for each of the input physical condition information, estimation of the fluctuation amount by means of the neural network multiple times with one or more parameters freely selected from the plurality of parameters being omitted.

Subsequently, the reliability evaluation unit evaluates reliability of multiple fluctuation amounts for each of the physical condition information estimated by the estimation unit, based on the estimated multiple fluctuation amounts.

As mentioned above, the inventors of the present invention have obtained the following knowledge as a result of intensive studies: in the process of estimating the fluctuation amount as an output value by means of the neural network with the successively obtained physical condition information as an input value, in the case where estimation of the fluctuation amount is repeated multiple times with one or more parameters freely selected from the plurality of parameters being omitted, there is small variation in the estimated values when the input value is normal physical condition information that has been machine-learned, whereas there is large variation in the estimated values when the input value is physical condition information which has not been machine-learned.

Therefore, when the degree of variation in the fluctuation amounts estimated through the repeated estimation exceeds a predetermined threshold, the estimated values can be judged as having low reliability. On the other hand, when the degree of variation in the fluctuation amounts does not exceed the threshold, the estimated values can be judged as having high reliability. In this manner, the reliability evaluation unit evaluates reliability of the estimated fluctuation amounts.

With this fluctuation amount estimation device, since evaluation of reliability of the fluctuation amounts estimated based on the input physical condition information is carried out by the reliability evaluation unit, it is possible to make an objective judgement on reliability of the estimated fluctuation amounts. Therefore, it is possible to use the estimated fluctuation amounts appropriately, such as not using data regarding fluctuation amounts having low reliability.

Note that examples of the index for the degree of variation, i.e., the evaluation value, include standard deviation of variation (for example, $\sigma$, $2\sigma$, $3\sigma$, $4\sigma$, $6\sigma$) and range of variation. Examples of the fluctuation relevant to a position of an element arranged in the machine tool include position fluctuation (displacement) of a predetermined portion of an element, such as position fluctuation (displacement) of a portion of a ball screw used for an axial movement and position fluctuation (displacement) of a distal end of a spindle holding and rotating a tool or a workpiece. Examples of the fluctuation of a distance between elements include fluctuation of a distance between a workpiece and a tool arranged in the machine tool. Examples of the physical condition information include temperature information of a constituting element of the machine tool and information relevant to tool wear.

It is preferred that the fluctuation amount estimation device according to the present invention further includes an evaluation information output unit that outputs evaluation information regarding the reliability evaluated by the reliability evaluation unit to outside.

The present invention also provides a correction amount calculation device including:
  the above-described fluctuation amount estimation device;
  a correction amount calculation unit calculating a correction amount for the multiple fluctuation amounts for each of the physical condition information estimated by the estimation unit, based on the multiple fluctuation amounts; and a correction amount output unit outputting the correction amount calculated by the correction amount calculation unit to outside.

In this correction amount calculation device, the correction amount calculation unit calculates a correction amount for the multiple fluctuation amounts for each of the physical condition information estimated by the estimation unit, based on the multiple fluctuation amounts. For example, the correction amount calculation unit calculates an average of the estimated multiple fluctuation amounts and then calculates a correction amount corresponding to the average fluctuation amount (a correction value which eliminates the average fluctuation amount). In this manner, an appropriate correction amount is calculated for the fluctuation amount that has variation in its estimated values.

In this regard, the correction amount calculation unit may be configured to carry out the above-described correction amount calculation when the estimated fluctuation amounts are judged by the reliability evaluation unit as having high reliability, for example, when the evaluation value for the reliability evaluated by the reliability evaluation unit is a value which is judged as having high reliability with respect to a predetermined reference value, and not to carry out the correction account calculation when the evaluation value is a value which is judged as having low reliability with respect to the predetermined reference value. With this configuration, a correction amount is calculated only when the estimated fluctuation amounts have high reliability, whereas a correction amount is not calculated when the estimated fluctuation amounts have low reliability; therefore, it is possible to prevent correction based on an inappropriate correction amount.

Alternatively, the correction amount calculation unit may be configured to calculate a correction amount adjusted in accordance with an evaluation result evaluated by the reliability evaluation unit. For example, the correction amount calculation unit may be configured to calculate a correction amount by moving averaging when the evaluation value for the reliability evaluated by the reliability evaluation unit is a value which is judged as having low reliability with respect to a predetermined reference value. Calculating a correction amount by moving averaging prevents the occurrence of large variation in successively calculated correction amounts, so that it is possible to carry out correction smoothly to some degree.

Alternatively, the correction amount calculation unit may be configured to calculate a correction amount corresponding to a minimum one of the estimated multiple fluctuation amounts when the evaluation value for the reliability evaluated by the reliability evaluation unit is a value which is judged as having low reliability with respect to a predetermined reference value. With this configuration, even when the estimated fluctuation amounts have low reliability, a minimum correction amount is calculated, so that it is possible to carry out correction and it is possible to prevent extreme and excessive correction.

Advantageous Effects of Invention

As described above, with the fluctuation amount estimation device according to the present invention, since reliability of the fluctuation amounts estimated based on the input physical condition information is evaluated by the reliability evaluation unit, it is possible to make an objective judgement on reliability of the estimated fluctuation amounts. Therefore, it is possible to use the estimated fluctuation amounts appropriately.

Further, with the correction amount calculation device according to the present invention, for example, in the case where the correction amount calculation unit is configured to calculate an average of the estimated multiple fluctuation amounts and then calculate a correction amount corresponding to the average fluctuation amount, it is possible to calculate an appropriate correction amount for the fluctuation amount that has variation in its estimated values. Further, in the case where the correction amount calculation unit is configured not to calculate a correction amount when the estimated fluctuation amounts have low reliability, it is possible to prevent correction based on an inappropriate correction amount. Furthermore, in the case where the correction amount calculation unit is configured to calculate a correction amount adjusted in accordance with the evaluation result, it is possible to prevent the occurrence of large variation in successively calculated correction amounts and carry out correction smoothly to some degree.

DESCRIPTION OF EMBODIMENTS

Hereinafter, a specific embodiment of the present invention will be described with reference to the drawings. FIG.

1 is a block diagram illustrating a correction amount calculation device according to the embodiment.

Figure 3:
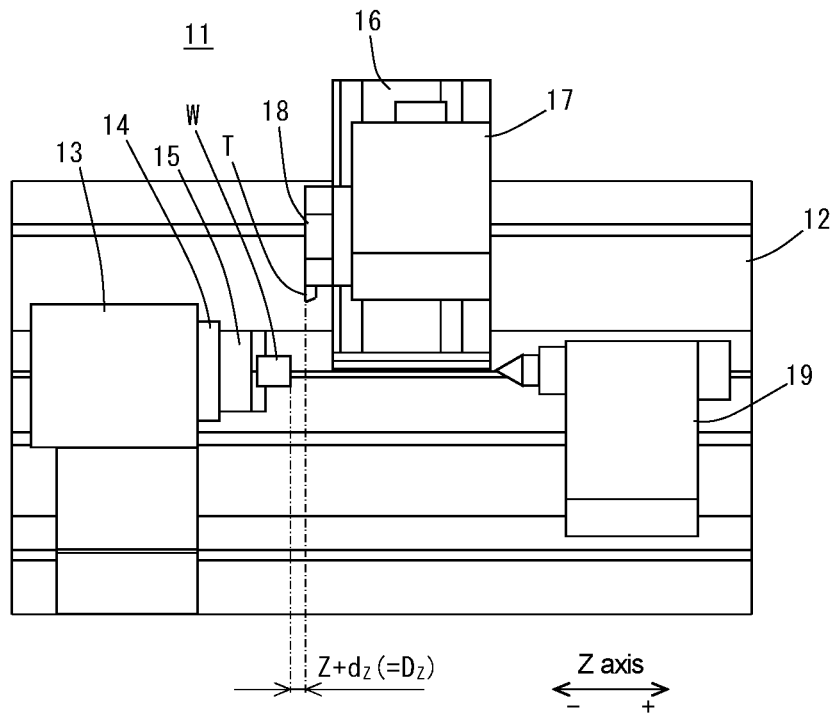
FIG. 3 is a front view of a machine tool used in the embodiment.
Figure 4:
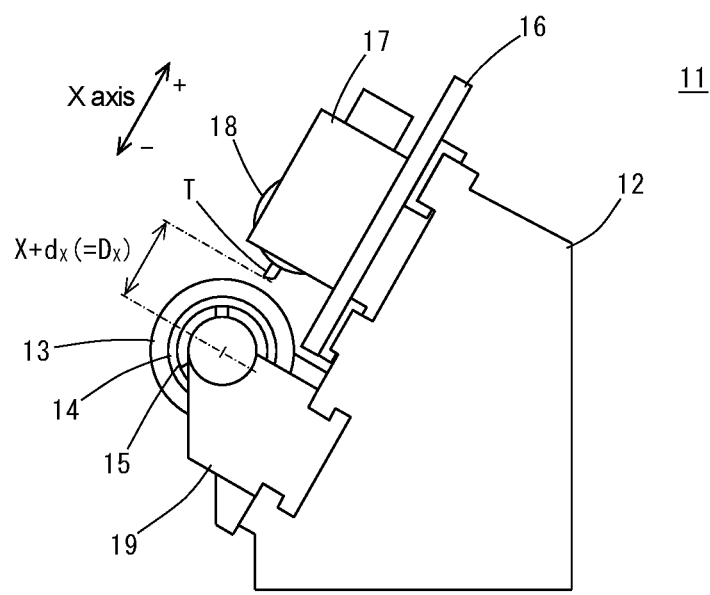
FIG. 4 is a right side view of the machine tool illustrated in FIG. 3.

The correction amount calculation device 1 according to this embodiment estimates a fluctuation amount of a distance between a tool T and a workpiece W in a machine tool 11 as illustrated in FIGS. 3 and 4 that is caused by thermal displacement of components of the machine tool 11, and calculates a correction amount for the estimated fluctuation amount. Note that, needless to say, the machine tool 11 used in this embodiment is only an example and the invention may be applied to any other type of machine tool. Note further that the fluctuation amount of the distance between the tool T and the workpiece W estimated in this embodiment is only an example and the fluctuation amount to be estimated in the invention is not limited thereto.

[Machine Tool]

First, a schematic configuration of the machine tool 11 used in this embodiment is briefly described. As illustrated in FIGS. 3 and 4, the machine tool 11 is the so-called NC lathe, and includes a bed 12, a headstock 13 arranged on the bed 12, and a carriage 16 and a tailstock 19 arranged on the bed 12 to be movable in the direction of Z axis that is indicated by an arrow in the drawings. Motion mechanisms of the machine tool 11 are controlled by an NC device 10 shown in FIG. 1.

A spindle 14 is arranged to have a center axis extending along the Z axis, and is supported by the headstock 13 to be rotatable about the center axis. The spindle 14 has a chuck 15 attached to a distal end thereof, and the chuck 15 clamps the workpiece W. Note that the spindle 14 rotates about the center axis by being driven by a spindle motor (not illustrated) incorporated in the headstock 13. The carriage 16 can be moved in the Z-axis direction by a Z-axis feed apparatus that is not illustrated in the drawings. The carriage 16 has a tool rest 17 arranged thereon. The tool rest 17 includes a turret 18 for attaching the tool T thereto, and can be moved in the direction of X axis that is indicated by an arrow in the drawings, by an X-axis feed apparatus that is not illustrated in the drawings.

Thus, in this machine tool 11, under control by the NC device 10, the spindle motor, the X-axis feed apparatus, and the Z-axis feed apparatus are driven as appropriate so that the tool T is moved relative to the workpiece W in an X-Z pane. By this relative movement of the tool T, the workpiece W is machined into a desired shape.

[Correction Amount Calculation Device]

Figure 1:
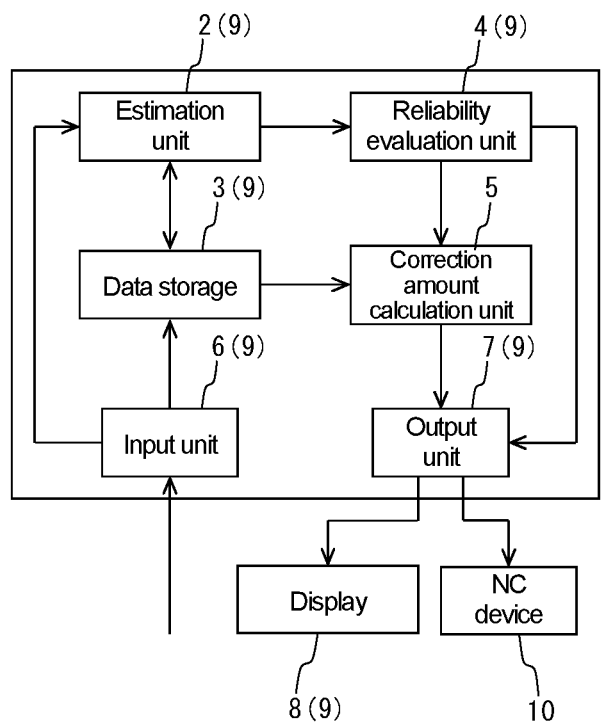
FIG. 1 is a block diagram illustrating a correction amount calculation device according to an embodiment of the present invention.

Next, a configuration of the correction amount calculation device 1 according to this embodiment is described. As illustrated in FIG. 1, the correction amount calculation device 1 consists of processing units, namely, an estimation unit 2, a data storage 3, a reliability evaluation unit 4, a correction amount calculation unit 5, an input unit 6, and an output unit 7, and a display 8 connected to the output unit 7. In this correction amount calculation device 1, the estimation unit 2, the data storage 3, the reliability evaluation unit 4, the correction amount calculation unit 5, the input unit 6, and the output unit 7 are composed of a computer including a CPU, a RAM, and a ROM. The estimation unit 2, the reliability evaluation unit 4, the correction amount calculation unit 5, the input unit 6, and the output unit 7 are functionally implemented by a computer program to execute the processes described later. Further, the data storage 3 is composed of an appropriate storage medium such as a RAM. The estimation unit 2, the data storage 3, the reliability evaluation unit 4, the input unit 6, the output unit 7, and the display 8 together function as a fluctuation amount estimation device 9.

Figure 2:
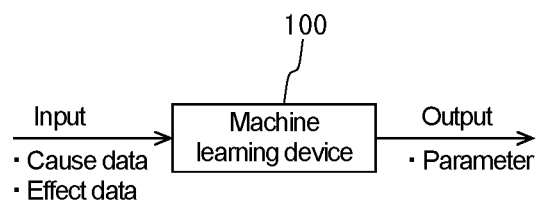
FIG. 2 is a block diagram illustrating a machine learning device.

The data storage 3 is a functional unit that stores therein a plurality of parameters defining a relation between temperature data as information indicative of a physical condition of the machine tool 11 and the fluctuation amount of the distance between the tool T and the workpiece W. These parameters are obtained by backpropagation-based supervised machine learning using a neural network, which are calculated by a machine learning device 100 as illustrated in FIG. 2.

The temperature data (cause data) as training data is measured by temperature sensors $S_1$ to $S_i$ that are respectively disposed at appropriate positions on the components of the machine tool 11, namely, the bed 12, the headstock 13, the carriage 16, and the tool rest 17. The fluctuation amount of the distance between the tool T and the workpiece W (effect data) is measured by a displacement sensor that is arranged appropriately so as to measure the distance between the tool T and the workpiece W. Note that i is a natural number from 1 to n.

Specifically, the temperature sensors $S_1$ to $S_i$ disposed in the machine tool 11 respectively measure temperatures $t_1$ to $t_i$ at predetermined sampling intervals, and simultaneously the displacement sensor measures a displacement amount (thermal displacement amount) d of the distance between the tool T and the workpiece W. Note that the thermal displacement amount d is measured as a thermal displacement amount $d_X$ in the X-axis direction and a thermal displacement amount $d_Z$ in the Z-axis direction.

Figure 5:
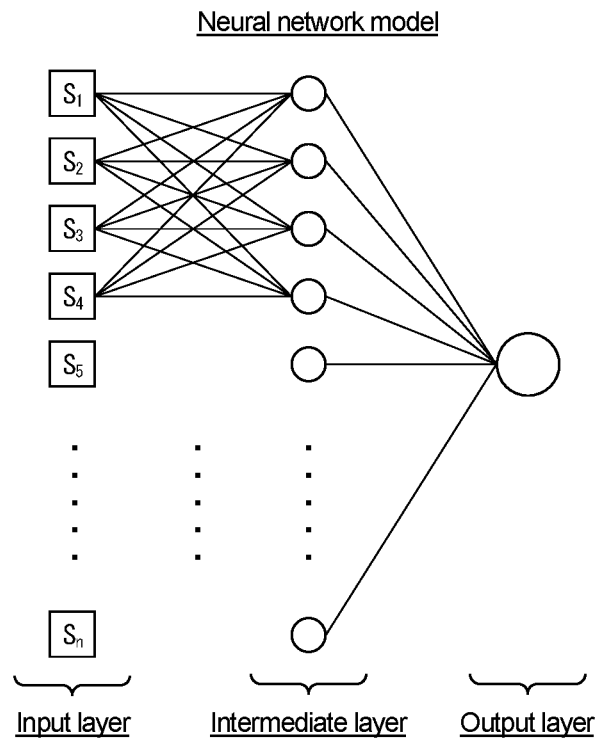
FIG. 5 is an illustrative diagram showing a neural network model as a manner of machine learning.
Figure 6:
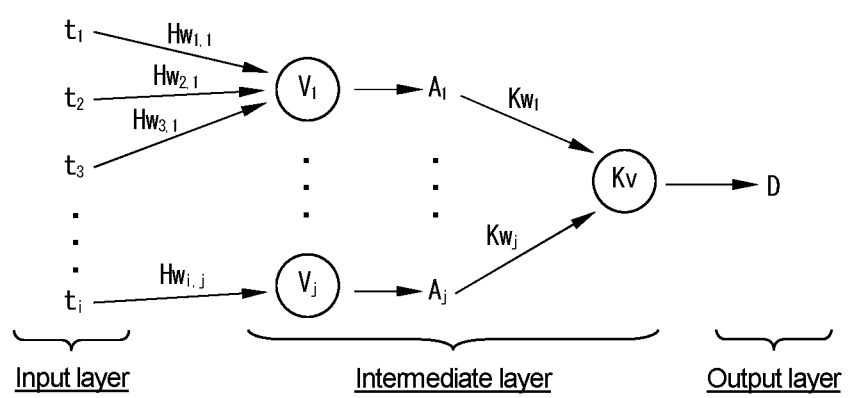
FIG. 6 is an illustrative diagram showing an arithmetic algorithm for estimation based on a neural network model.

A typical neural network model used in the machine learning device 100 is illustrated in FIG. 5, and an arithmetic algorithm in this neural network model is illustrated in FIG. 6. In the arithmetic algorithm illustrated in FIG. 6, $t_1$ to $t_i$ in the input layer respectively correspond to output values of the temperature sensors $S_1$ to $S_i$. Further, $Hw_{i,j}$ and $Hw_i$ are weighting factors, and $V_j$ and $Kv$ are thresholds as reaction sensitivity. Further, output $A_j$ in the intermediate layer is calculated by Equation 1 below. Note that j is a natural number from 1 to m.

$$A_j = f((\Sigma Hw_{i,j} \cdot t) + V_j) \quad \text{(Equation 1)}$$

Further, output D as an estimated value in the output layer is calculated by Equation 2 below.

$$D = f((\Sigma Kw_j A_j) + Kv) \quad \text{(Equation 2)}$$

Note that the outputs $A_j$ and D are transformed by a sigmoid function represented by Equation 3 below or the like.

$$f(u) = 1/(1 + \exp(-u)) \quad \text{(Equation 3)}$$

By using data regarding the temperatures $t_1$ to $t_i$ and thermal displacement amounts $d_X$, $d_Z$ obtained as described above as training data and using the above-described arithmetic algorithm, after setting the number of intermediate layer neurons and the number of intermediate layers appropriately, the machine learning device 100 calculates parameters $A_{Xj}$, $Kw_{Xj}$, $Kv_X$, $Hw_{Xi,j}$, and $V_{Xj}$ for the thermal displacement amount $D_X$ in the X-axis direction and parameters $A_{Zj}$, $Kw_{Zj}$, $Kv_Z$, $Hw_{Zi,j}$, and $V_{Zj}$ for the thermal displacement amount $D_Z$ in the Z-axis direction by the above-described backpropagation-based supervised machine learning. Note that the number of intermediate layer neurons j is freely selected; generally, a larger number of intermediate layer neurons j leads to higher accuracy.

The backpropagation-based supervised machine learning in this embodiment is such that: output values of the temperature sensors $S_1$ to $S_i$ that are previously obtained are each input as an input value t for the arithmetic algorithm illustrated in FIG. 6; an output value (estimated thermal displacement amount D ($D_X$, $D_Z$)) obtained by setting the weighting factors $Hw_{i,j}$ and $Kw_j$ and the thresholds $V_j$ and Kv appropriately is compared with the true value (measured thermal displacement amount=d ($d_X$, $d_Z$)); and the operation of changing the weighting factors $Hw_{i,j}$ and $Kw_j$ and the thresholds $V_j$ and Kv is repeatedly carried out so that the difference between the obtained output value and the true value is reduced, that is to say, so that the obtained output value converges to the true value, whereby optimal values are set for the weighting factors $Hw_{i,j}$ and $Hw_i$ and thresholds $V_j$ and Kv as parameters. Note that the input value t in the input layer and the thresholds $V_j$, Kv in the intermediate layer in FIG. 6 are each called "node", while the weighting factors $Hw_{i,j}$ and $Kw_j$ are each called "edge". Note further that the thermal displacement amounts $D_X$ and $d_X$ in the X-axis direction in this embodiment are radius values.

By performing this backpropagation-based machine learning based on data regarding the temperatures $t_1$ to $t_i$ and thermal displacement amounts $d_X$, $d_Z$ obtained as training data, the machine learning device 100 sets the parameters $A_{Xj}$, $A_{Zj}$, $Kw_{Xj}$, $Kw_{Zj}$, $Kv_X$, $Kv_Z$, $V_{Xj}$, and $V_{Zj}$ for estimating (calculating) the thermal displacement amounts $D_X$, $D_Z$ based on the temperatures $t_1$ to $t_i$ measured by the temperature sensors $S_1$ to $S_i$. The calculated parameters $A_{Xj}$, $A_{Zj}$, $Kw_{Xj}$, $Kw_{Zj}$, $Kv_X$, $Kv_Z$, $V_{Xj}$, and $V_{Zj}$ are stored into the data storage 3 through the input unit 6.

Figure 7:
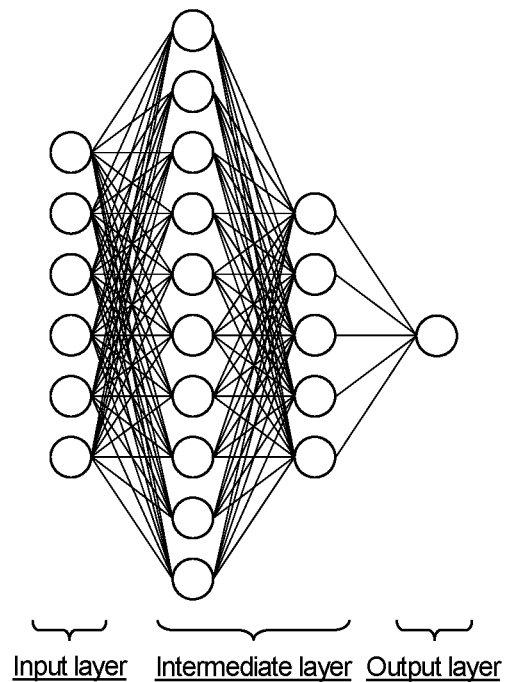
FIG. 7 is an illustrative diagram showing a neural network model for deep learning.

Note that, although the neural network model illustrated in FIG. 5 that has a relatively simple structure is only an example for easy understanding and the neural network model to be used is not limited thereto. A neural network model with multiple intermediate layers as illustrated in FIG. 7, which is generally called "deep learning", may be used. In such a case, the arithmetic algorithm illustrated in FIG. 6 is also to be adapted for such a deep-learning neural network model.

The estimation unit 2 inputs the temperatures $t_1$ to $t_i$ measured by the temperature sensors $S_1$ to $S_i$ arranged in the machine tool 11 at predetermined sampling intervals through the input unit 6, and calculates, for each set of temperatures $t_1$ to $t_i$, the thermal displacement amount $D_X$ in the X-axis direction and the terminal displacement amount $D_Z$ in the Z-axis direction of the distance between the tool T and the workpiece W in accordance with Equation 4 and Equation 5 below using the parameters stored in the data storage 3, respectively.

$$D_X=1/(1+\exp(-((\Sigma A_{Xj} \cdot Kw_{Xj})+Kv_X))$$

$$A_{Xj}=1/(1+\exp(-((\Sigma Hw_{Xi,j} \cdot t_i)+V_{Xj}))) \quad \text{(Equation 4)}$$

$$D_Z=1/(1+\exp(-((\Sigma A_{Zj} \cdot Kw_{Zj})+Kv_Z))$$

$$A_{Zj}=1/(1+\exp(-((\Sigma Hw_{Zi,j} \cdot t_i)+V_{Zj}))) \quad \text{(Equation 5)}$$

Figure 8:
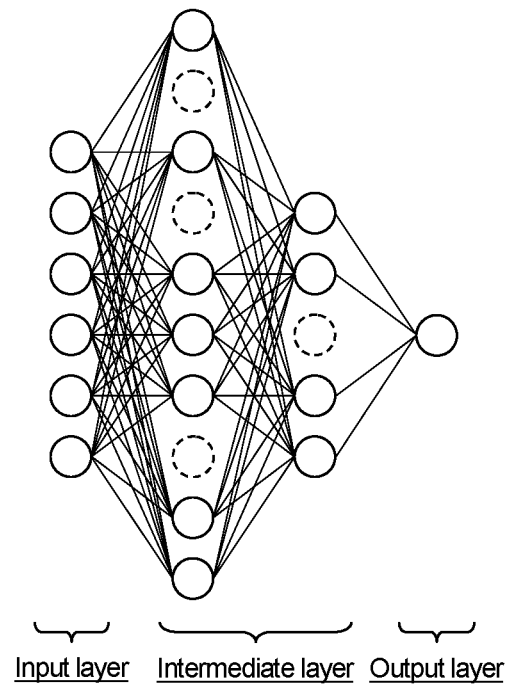
FIG. 8 is an illustrative diagram for explaining a manner of evaluating reliability of estimated values.

In this process, each time when a set of temperature data $t_1$ to $t_i$ is input, the estimation unit 2 repeats estimation of the thermal displacement amounts $D_X$, $D_Z$ using the neural network model, i.e., in accordance with Equation 4 and Equation 5 above, multiple times with one or more parameters freely selected from the parameters being omitted. For example, the estimation unit 2 carries out the estimation of the thermal displacement amounts $D_X$, $D_Z$ with one or more parameters (nodes) freely selected from the parameters $V_{Xj}$ and $V_{Zj}$ (intermediate layer nodes) of the neural network model illustrated in FIG. 5 being omitted and the parameters $Hw_{Xi,j}$, $Hw_{Zi,j}$, $Kw_{Xj}$, $Kw_{Zj}$ (intermediate layer edges) relevant (connected) to the selected parameter or parameters being omitted. Each time when a set of temperature data $t_1$ to $t_i$ is input, the estimation unit 2 repeats the estimation multiple times while changing the parameters to be omitted. For the purpose of easier understanding, a conceptual diagram in which freely selected nodes and edges relevant to the nodes are omitted from the neural network model illustrated in FIG. 7 is shown in FIG. 8. In FIG. 8, the omitted nodes are shown by broken lines and the lines indicative of the relevant edges are deleted.

The reliability evaluation unit 4 is a functional unit that evaluates, for each input set of temperature data $t_1$ to $t_i$, reliability of the multiple thermal displacement amounts $D_{Xk}$, $D_{Zk}$ estimated by the estimation unit 2, based on the estimated multiple thermal displacement amounts $D_{Xk}$, $D_{Zk}$. Note that k is a natural number from 1 to p, and p means the number of times of repeat.

As already mentioned above, the inventors of the present invention have obtained the following knowledge as a result of intensive studies: in the process of estimating the thermal displacement amounts $D_X$, $D_Z$ (fluctuation amount) as an output value by using the neural network, for example, with a set of temperature data $t_1$ to $t_i$ (physical condition information) obtained successively as an input value, in the case where estimation of the thermal displacement amounts $D_X$, $D_Z$ is repeated multiple times with one or more parameters freely selected from the plurality of parameters being omitted, there is small variation in the estimated values when the input value is a normal value that has been machine-learned, whereas there is large variation in the estimated values when the input value is a value which has not been machine-learned.

Therefore, when the degree of variation in the thermal displacement amounts $D_{Xk}$, $D_{Zk}$ estimated through the repeated estimation exceeds a predetermined reference value (threshold), the estimated values can be judged as having low reliability. On the other hand, when the degree of variation in the estimated fluctuation amounts does not exceed the reference value (threshold), the estimated values can be judged as having high reliability.

Figure 9:
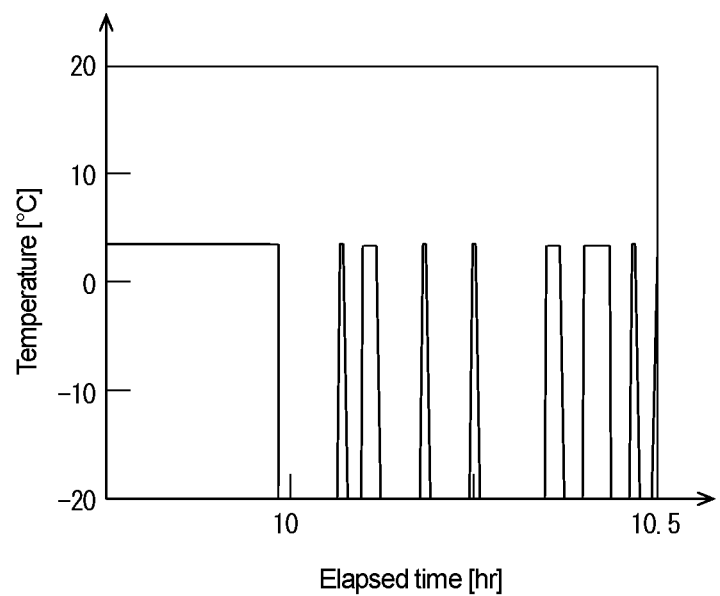
FIG. 9 is a graph showing an example of temperature data as an input value for estimation based on a neural network model.
Figure 10:
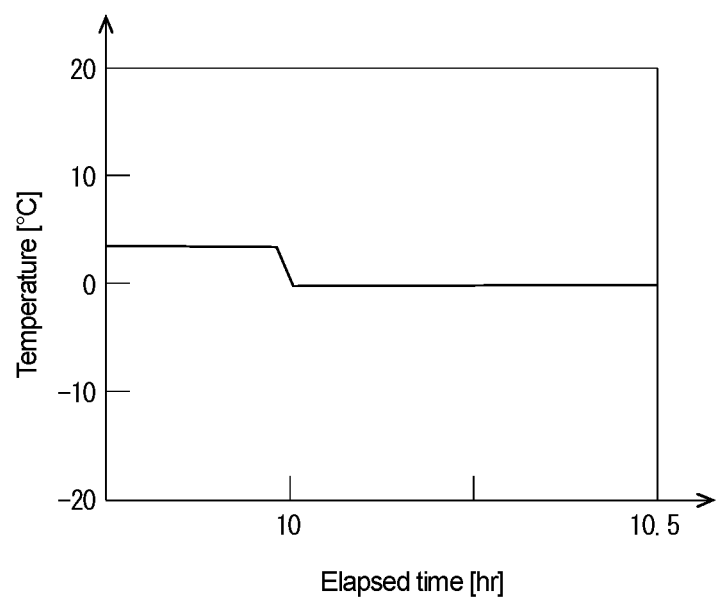
FIG. 10 is a graph showing an example of temperature data as an input value for estimation based on a neural network model.
Figure 11:
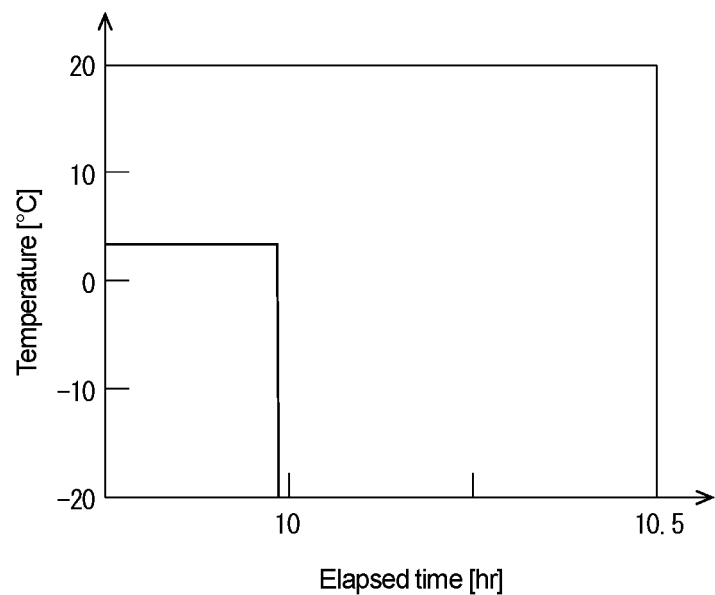
FIG. 11 is a graph showing an example of temperature data as an input value for estimation based on a neural network model.
Figure 12:
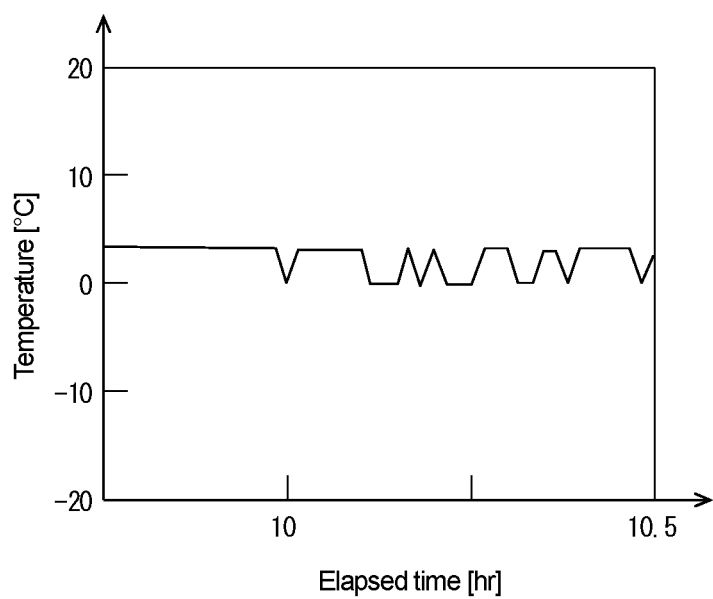
FIG. 12 is a graph showing an example of temperature data as an input value for estimation based on a neural network model.

FIGS. 9 to 12 show examples of output data which is output in the event of failure of a temperature sensor used in measurement. FIGS. 9 and 11 each show output data which is output in the event of disconnection of a temperature sensor of a resistance-value output type. In each case, an extremely abnormal value (as low temperature data as −128° C.) is output. FIGS. 10 and 12 each show output data which is output in the event of disconnection of a temperature sensor of voltage output type. In such a case, the output value of 0° C. is obtained.

Figure 13:
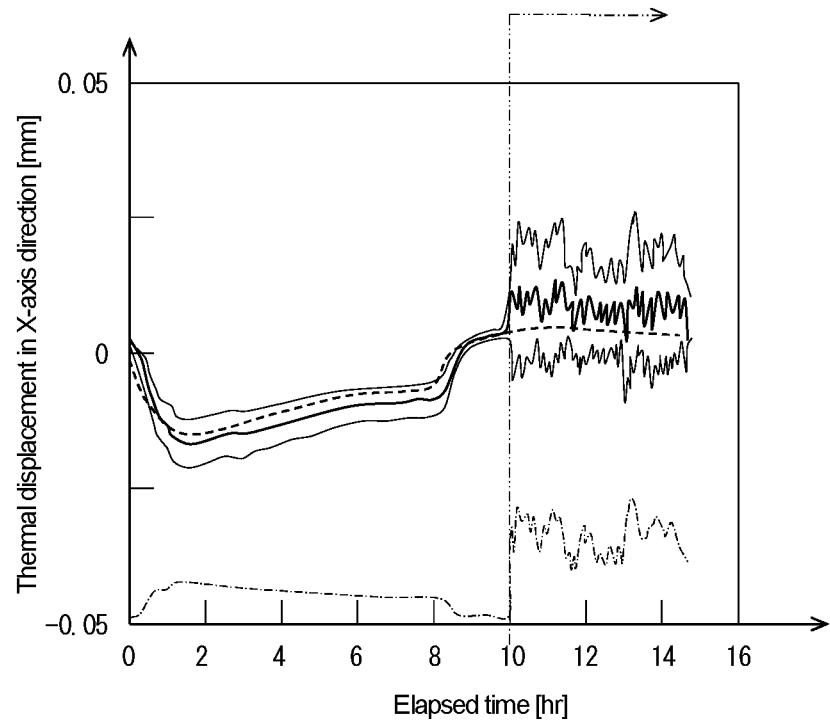
FIG. 13 is an illustrative diagram for explaining evaluation of reliability of estimated values based on the input value shown in FIG. 9.
Figure 14:
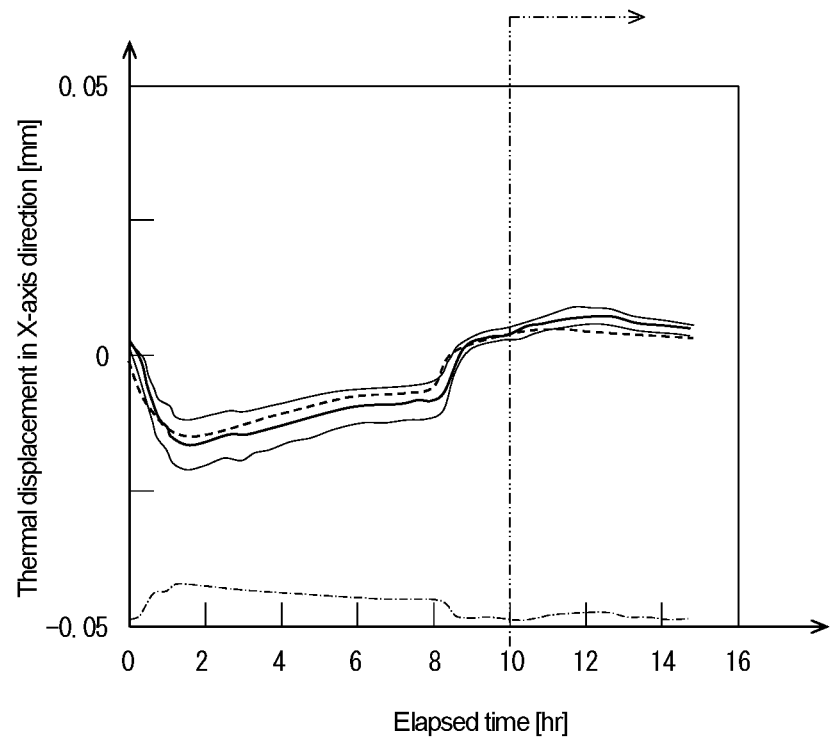
FIG. 14 is an illustrative diagram for explaining evaluation of reliability of estimated values based on the input value shown in FIG. 10.
Figure 15:
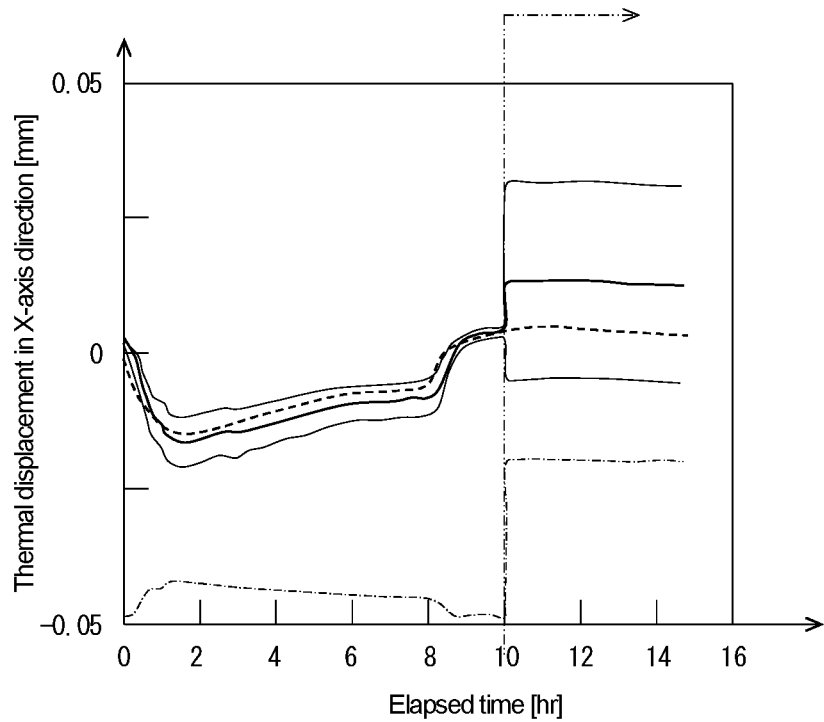
FIG. 15 is an illustrative diagram for explaining evaluation of reliability of estimated values based on the input value shown in FIG. 11.
Figure 16:
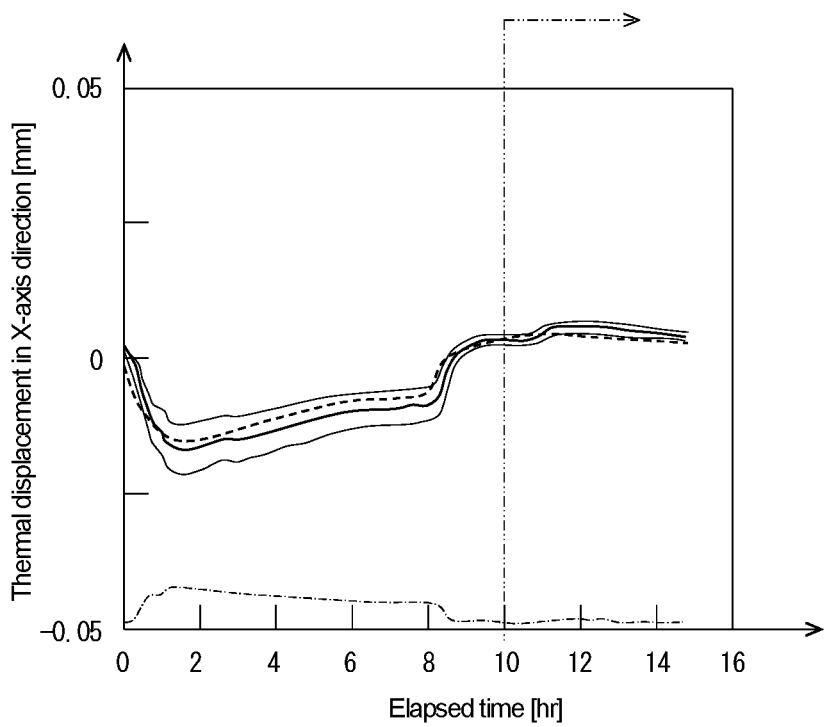
FIG. 16 is an illustrative diagram for explaining evaluation of reliability of estimated values based on the input value shown in FIG. 12.

FIGS. 13 to 16 show results obtained in the case where the thermal displacement amounts $D_{Xk}$ are estimated through the above-described repeated estimation when the temperature data shown in FIGS. 9 to 12 are input. FIG. 13 shows the estimated thermal displacement amounts $D_{Xk}$ obtained when the temperature data shown in FIG. 9 is input. FIG. 14 shows the estimated thermal displacement amounts $D_{Xk}$ obtained when the temperature data shown in FIG. 10 is input. FIG. 15 shows the estimated thermal displacement amounts $D_{Xk}$ obtained when the temperature data shown in FIG. 11 is input. FIG. 16 shows the estimated thermal displacement amounts $D_{Xk}$ obtained when the temperature data shown in FIG. 12 is input. In FIGS. 13 to 16, the broken-line curve represents the measured value ($d_X$) of the thermal displacement amount. Further, the upper thin solid line represents a curve connecting values obtained by adding a standard deviation to an average of the thermal displacement amounts $D_{Xk}$ estimated through the repeated estimation, while the lower thin solid line represents a curve connecting values obtained by subtracting the standard deviation from the average of the estimated thermal displacement amounts $D_{Xk}$. The bold solid line represents a curve connecting the averages. Further, the dashed and dotted line represents a curve that indicates the standard deviation of the estimated thermal displacement amounts $D_{Xk}$.

As shown in FIGS. 13 and 15, in the case where an extremely abnormal value is output because of disconnection of a temperature sensor of resistance-value output type, there is a large degree of variation in the values of the thermal displacement amounts $D_{Xk}$ estimated through the repeated estimation. In FIGS. 13 and 15, input of an abnormal value from the temperature sensor begins after the elapsed time exceeds 10 hours. On the other hand, extremely abnormal data is not output in the event of failure of a temperature sensor of voltage output type. Therefore, as shown in FIGS. 14 and 16, the variation in the values of the thermal displacement amounts $D_{Xk}$ estimated through the repeated estimation is not much different from that seen when normal data is output.

Therefore, when the degree of variation in the thermal displacement amounts $D_{Xk}$, $D_{Zk}$ estimated through the repeated estimation exceeds, for example, a predetermined reference value (threshold), the reliability evaluation unit 4 judges the estimated values as having low reliability. On the other hand, when the degree of variation in the thermal displacement amounts $D_{Xk}$, $D_{Zk}$ does not exceed the reference value (threshold), the reliability evaluation unit 4 judges the estimated values as having high reliability. Examples of the index for the degree of variation, i.e., the evaluation value for reliability, include range of variation (difference between maximum and minimum values), standard deviation $\sigma$ obtained by statistical processing of the variation, as well as $2\sigma$, $3\sigma$, $4\sigma$, $6\sigma$ obtained from standard deviation $\sigma$. By using any one of these indexes as the evaluation value, the reliability evaluation unit 4 judges the estimated values as having low reliability when the value of the index exceeds a predetermined reference value (threshold), and judges the estimated values as having high reliability when the value of the index does not exceed the reference value. The reliability evaluation unit 4 displays the evaluation result on the display 8 through the output unit 7. Alternatively, the reliability evaluation unit 4 may be configured to display an error indication on the display 8 when the estimated values are judged as having low reliability. In this case, the output unit 7 functions as an evaluation information output unit. Note that the reliability judgement is not limited to using a single reference value. The reliability judgment may use multiple reference values to rate reliability of the estimated values on a scale of grades such as Reliability 1, Reliability 2, Reliability 3, and so on.

Based on the thermal displacement amounts $D_{Xk}$, $D_{Zk}$ estimated by the estimation unit 2 and the evaluation result evaluated by the reliability evaluation unit 4, the correction amount calculation unit 5 calculates correction amounts $C_X$, $C_Z$ that are adjusted in accordance with the evaluation result. For example, when evaluation result evaluated by the reliability evaluation unit 4 is "high reliability", the correction amount calculation unit 5 calculates thermal displacement amounts $D_{Xa}$, $D_{Za}$ as representative values that are obtained by simple averaging of the thermal displacement amounts $D_{Xk}$, $D_{Zk}$, and then calculates a correction amount $C_X$ for the thermal displacement amount $D_{Xa}$ in the X-axis direction and a correction amount $C_Z$ for the thermal displacement amount $D_{Za}$ in the Z-axis direction in accordance with Equation 6 below. On the other hand, when the evaluation result evaluated by the reliability evaluation unit 4 is "low reliability", the calculation amount calculation unit 5 calculates thermal displacement amounts $D_{Xa}$, $D_{Za}$ as representative values by performing simple averaging of the thermal displacement amounts $D_{Xk}$, $D_{Zk}$ and moving averaging of the simple average with previous ones, and then calculates correction amounts $C_X$, $C_Z$ in accordance with Equation 6 below.

$$C_X = -D_{Xa}$$

$$C_Z = -D_{Za} \qquad \text{(Equation 6)}$$

The correction amount calculation unit 5 outputs the calculated correction amounts $C_X$, $C_Z$ to the NC device 10 through the output unit 7. The NC device 10 corrects a relative positioning position for the workpiece W and the tool T in the machine tool 100 based on the correction amounts $C_X$, $C_Z$. In this process, the output unit 7 functions as a correction amount output unit.

In the correction amount calculation device 1 having the above-described configuration, the estimation unit 2 estimates, based on temperature data $t_1$ to $t_i$ input successively from the machine tool 11 and the parameters stored in the data storage 3, thermal displacement amounts $D_X$, $D_Z$ between the tool T and the workpiece W for each input set of temperature data $t_1$ to $t_i$.

Figure 17:
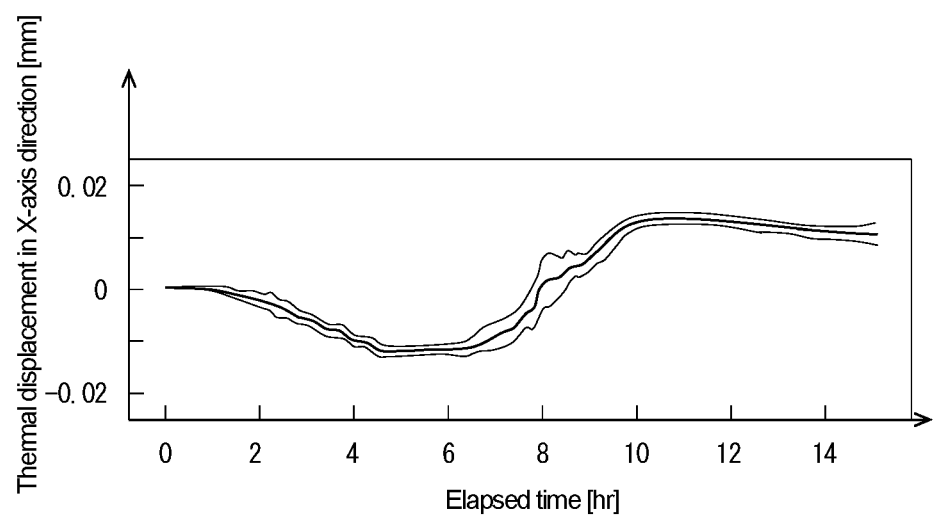
FIG. 17 is an illustrative diagram showing a result of evaluation of reliability.

In this process, the estimation unit 2 carries out the estimation using the Equation 4 and Equation 5 above with one or more parameters freely selected from the parameters being omitted, and repeats the estimation multiple times while changing the parameters to be omitted, thereby calculating thermal displacement amounts $D_{Xk}$, $D_{Zk}$. The estimation unit 2 outputs data regarding the calculated thermal displacement amounts $D_{Xk}$, $D_{Zk}$ to the reliability evaluation unit 4. An example of the thus-estimated thermal displacement amounts in the X-axis direction is shown in FIG. 17. In FIG. 17, the upper thin solid line represents a curve connecting values obtained by adding a standard deviation to an average of the thermal displacement amounts $D_{Xk}$ estimated through the repeated estimation, the lower thin solid line represents a curve connecting values obtained by subtracting the standard deviation from the average of the estimated thermal displacement amounts $D_{Xk}$, and the bold solid line represents a curve connecting the averages.

The reliability evaluation unit 4 evaluates reliability of the estimated thermal displacement amounts $D_{Xk}$, $D_{Zk}$ input from the estimation unit 2 on the basis of an index (evaluation value) for the degree of variation in the estimated thermal displacement amounts $D_{Xk}$, $D_{Zk}$, and outputs the evaluation result to the correction amount calculation unit 5 and to the display 8 through the output unit 7 so that the evaluation result is displayed on the display 8. Since the reliability of the thermal displacement amounts $D_{Xk}$, $D_{Zk}$ estimated by the estimation unit 2 is evaluated by the evaluation unit 4 and the evaluation result is displayed on the display 8, it is possible to make an objective judgement on reliability of the estimated thermal displacement amounts $D_{Xk}$, $D_{Zk}$.

The correction amount calculation unit 5 calculates, based on the thermal displacement amounts $D_{Xk}$, $D_{Zk}$ estimated by the estimation unit 2 and the evaluation result provided by the reliability evaluation unit 4, correction amounts $C_X$, $C_Z$ adjusted in accordance with the evaluation result, and outputs the calculated correction amounts $C_X$, $C_Z$ to the NC device 10 through the output unit 7. Thus, with the correction amount calculation device 1, since correction amounts subjected to reliability-based adjustment are calculated even when the estimated thermal displacement amounts $D_{Xk}$, $D_{Zk}$ have low reliability because of a large degree of variation in the thermal displacement amounts $D_{Xk}$, $D_{Zk}$, it is possible to prevent the occurrence of large variation in successively calculated correction amounts, so that it is possible to carry out correction smoothly to some degree.

Hereinbefore, an embodiment of the present invention has been described. However, it should be understood that the present invention is not limited to the above-described embodiment and may be implemented in other manners.

For example, the correction amount calculation unit 5 may be configured to, when the evaluation value for the reliability evaluated by the reliability evaluation unit 4 is a value which is judged as having low reliability with respect to a predetermined reference value, designate thermal displacement amount $D_{Xmin}$, $D_{Zmin}$ respectively having the minimum absolute value among the estimated thermal displacement amounts $D_{Xk}$, $D_{Zk}$ as representative values, that is to say, $D_{Xa}=D_{Xmin}$, $D_{Za}=D_{Zmin}$, and calculate correction amounts $C_X$, $C_Z$ for the designated thermal displacement amounts. With this configuration, even when the estimated thermal displacement amounts $D_{Xk}$, $D_{Zk}$ have low reliability, minimum correction amounts are calculated, so that it is possible to carry out correction and it is possible to prevent extreme and excessive correction.

Alternatively, the correction amount calculation unit 5 may be configured not to perform the calculation of correction amounts $C_X$, $C_Z$ when the evaluation value for the reliability evaluated by the reliability evaluation unit 4 is a value which is judged as having low reliability with respect to a predetermined reference value. With this configuration, correction amounts $C_X$, $C_Z$ are calculated only when the estimated thermal displacement amounts $D_{Xk}$, $D_{Zk}$ have high reliability, whereas correction amounts $C_X$, $C_Z$ are not calculated when the estimated thermal displacement amounts $D_{Xk}$, $D_{Zk}$ have low reliability; therefore, it is possible to prevent correction based on an inappropriate correction amount.

Further, the fluctuation amount to be estimated in the above embodiment is a thermal displacement amount between the tool T and the workpiece W; however, the present invention is not limited thereto. The fluctuation amount to be estimated may be position fluctuation (thermal displacement) by temperature change of a predetermined portion of an element arranged in the machine tool 11, e.g., position fluctuation (thermal displacement) by temperature change of portions of ball screws used in the X-axis feed apparatus (not illustrated) and Z-axis feed apparatus (not illustrated) or position fluctuation (thermal displacement) by temperature change of a distal end of a spindle holding and rotating a tool or a workpiece.

Alternatively, the physical condition information of the machine tool 11 may be condition information relevant to tool wear, e.g., information on load (supplied power) of the spindle motor and/or a feed motor in machining using the tool or information on the temperature of the tool or chips in machining, and the fluctuation amount to be estimated may be a tool wear amount. Note that the information on the temperature of the tool or chips in machining can be measured, for example, by an infrared camera. Further, the tool wear amount can be calculated by measurement using a displacement sensor or by processing an image of a tool tip captured by a camera.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made within the scope equivalent to the scope of the claims.

REFERENCE SIGNS LIST

1 Correction amount calculation device
2 Estimation unit
3 Data storage
4 Reliability evaluation unit
5 Correction amount calculation unit
6 Input unit
7 Output unit
8 Display
9 Fluctuation amount estimation device
10 NC device
11 Machine tool
T Tool
W Workpiece

The invention claimed is:

1. A correction amount calculation device in a machine tool, comprising:
a fluctuation amount estimation device comprising:
a parameter storage storing therein a plurality of parameters defining a relation between a fluctuation amount relevant to a position of an element arranged in the machine tool or a fluctuation amount of a distance between elements arranged in the machine tool and physical condition information as information indicative of a physical condition of the machine tool, the plurality of parameters being constituent elements of a neural network and being obtained by machine learning using the neural network,
an estimation unit estimating the fluctuation amount based on the parameters stored in the parameter storage and the physical condition information input successively from outside of the estimation unit, the estimation unit repeating, for each of the input physical condition information, the estimation of the fluctuation amount by means of the neural network multiple times with a subset of the parameters selected from a plurality of parameters being omitted from estimating the fluctuation amount, and
a reliability evaluation unit evaluating a reliability of multiple estimated fluctuation amounts for each of the physical condition information estimated by the estimation unit, based on the multiple estimated fluctuation amounts, wherein the fluctuation amount estimation device outputs a correction amount for the multiple fluctuation amounts for each of the physical condition information estimated by the estimation unit; and
a numerical control (NC) device operatively connected to the fluctuation amount estimation device, wherein the NC device receives the correction amount from the fluctuation amount estimation device and operates based on the correction amount to correct a relative position between the elements arranged in the machine tool.

2. The correction amount calculation device of claim 1, wherein the fluctuation amount estimation device includes an evaluation information output unit outputting evaluation information regarding the reliability evaluated by the reliability evaluation unit to outside of the evaluation information output unit.

3. The correction amount calculation device of claim 1, wherein the fluctuation amount of the distance between the elements is a fluctuation amount of a distance between a workpiece and a tool arranged in the machine tool.

4. The correction amount calculation device of claim 1, wherein the physical condition information is temperature information of a predetermined portion of the machine tool and the fluctuation amount is a thermal displacement amount.

5. The correction amount calculation device of claim 3, wherein the physical condition information is condition information relevant to tool wear and the fluctuation amount is a tool wear amount.

6. The correction amount calculation device of claim 1, comprising:
- a correction amount calculation unit calculating the correction amount for the multiple estimated fluctuation amounts for each of the physical condition information estimated by the estimation unit, based on the multiple estimated fluctuation amounts; and
- a correction amount output unit outputting the correction amount calculated by the correction amount calculation unit to outside of the correction amount output unit.

7. The correction amount calculation device of claim 6, wherein the correction amount calculation unit is configured to calculate the correction amount adjusted in accordance with an evaluation result evaluated by the reliability evaluation unit.

8. The correction amount calculation device of claim 6, wherein the correction amount calculation unit is configured to calculate the correction amount by moving averaging when an evaluation value for the reliability evaluated by the reliability evaluation unit is a value which is judged as having low reliability with respect to a predetermined reference value.

9. The correction amount calculation device of claim 6, wherein the correction amount calculation unit is configured to calculate the correction amount corresponding to a minimum one of the multiple estimated fluctuation amounts when an evaluation value for the reliability evaluated by the reliability evaluation unit is a value which is judged as having low reliability with respect to a predetermined reference value.

10. The correction amount calculation device of claim 6, wherein the correction amount calculation unit is configured not to calculate the correction amount when an evaluation value for the reliability evaluated by the reliability evaluation unit is a value which is judged as having low reliability with respect to a predetermined reference value.

11. The correction amount calculation device of claim 2, wherein the fluctuation amount of the distance between the elements is a fluctuation amount of a distance between a workpiece and a tool arranged in the machine tool.

12. The correction amount calculation device of claim 2, wherein the physical condition information is temperature information of a predetermined portion of the machine tool and the fluctuation amount is a thermal displacement amount.

13. The correction amount calculation device of claim 3, wherein the physical condition information is temperature information of a predetermined portion of the machine tool and the fluctuation amount is a thermal displacement amount.

14. The correction amount calculation device of claim 11, wherein the physical condition information is temperature information of a predetermined portion of the machine tool and the fluctuation amount is a thermal displacement amount.

15. The correction amount calculation device of claim 11, wherein the physical condition information is condition information relevant to tool wear and the fluctuation amount is a tool wear amount.

16. The correction amount calculation device of claim 1, wherein the NC device is operatively connected to a feed apparatus of the machine tool, wherein the NC device drives the feed apparatus based on the correction amount to correct the relative position between the elements.

* * * * *